United States Patent [19]
Hawes et al.

[11] 3,937,489
[45] Feb. 10, 1976

[54] MOTORCYCLE TRAILER

[76] Inventors: Edward L. Hawes, 405 E. Goulson, Hazel Park, Mich. 48030; Allen R. Hawes, 453 E. Marshall; Edward C. Hawes, 2129 Leitch, both of Ferndale, Mich. 48220

[22] Filed: May 16, 1973

[21] Appl. No.: 360,635

[52] U.S. Cl. ................................................ 280/204
[51] Int. Cl.² ........................................... B62K 27/00
[58] Field of Search .............. 280/204, 402; 296/1 S

[56] References Cited
UNITED STATES PATENTS

| | | | |
|---|---|---|---|
| 559,761 | 5/1896 | Armand | 280/204 |
| 1,311,816 | 7/1919 | Heintz | 280/204 |
| 2,212,958 | 8/1940 | Rea | 280/204 |
| 3,672,718 | 6/1972 | Broyer | 296/1 S |

FOREIGN PATENTS OR APPLICATIONS

| | | | |
|---|---|---|---|
| 654,655 | 11/1928 | France | 280/204 |
| 1,228,759 | 3/1960 | France | 280/204 |
| 254,986 | 1/1949 | Switzerland | 280/204 |
| 549,806 | 8/1956 | Belgium | 280/204 |

OTHER PUBLICATIONS
Bud Lang, Article & Pictures Appearing in Hot Rod Magazine Apr. 1967 issue, p. 54.

*Primary Examiner*—Leo Friaglia
*Attorney, Agent, or Firm*—Gifford, Chandler & Sheridan

[57] ABSTRACT

A trailer for a motorcycle including a hitch formed of two parallel flat plates attached to the trailer by a hinge having a transversely disposed horizontal axis. Another flat plate is sandwiched between the two parallel plates and the plates are fastened together by a pin inserted through holes in the plates to form a hinge having a vertical axis. Tubular members are mounted to the motorcycle and receive extensions adjustably mounted to the inner flat plate to thereby attach the trailer to the motorcycle. The trailer also has a resilient suspension system for the trailer road wheel which is adjustable to compensate for various loads carried on the trailer and is formed in a manner such that wind acting on the top of the trailer acts to urge the trailer downwardly to thus stabilize the trailer when in use.

9 Claims, 9 Drawing Figures

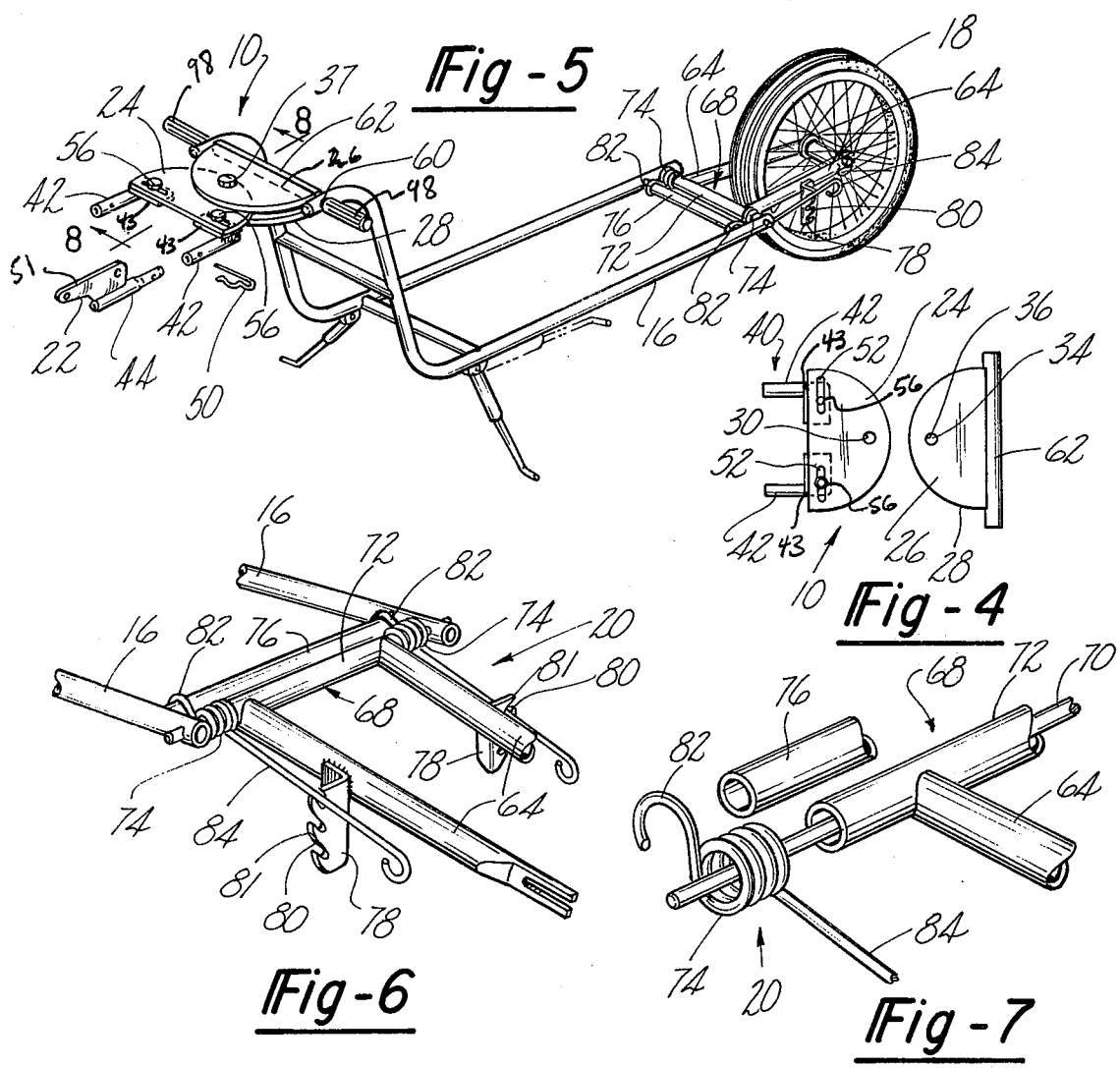
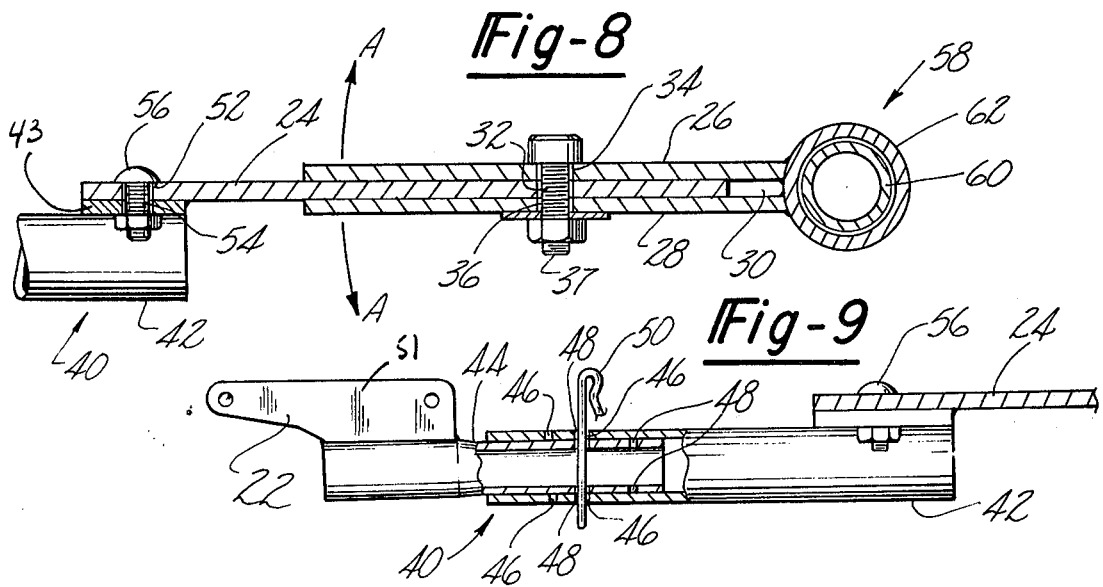

MOTORCYCLE TRAILER

BACKGROUND OF THE INVENTION

I. Field of the Invention

The invention relates to trailers to be towed behind two wheeled vehicles, especially those trailers having a single road wheel. In particular, the invention pertains to such a trailer provided with a novel hitch member to attach the trailer to a motorcycle, a novel adjustable trailer road wheel suspension system and means for urging the trailer downwardly while in use.

II. Description of the Prior Art

There are a number of prior art trailers adapted to be towed behind a motorcycle. One such prior art trailer incorporates a joint connecting the frame of the trailer with the towing motorcycle which includes two hinge axes, one of which is inclined upwardly and forwardly with respect to the road surface and the other of which is normally horizontal and also is perpendicular to the inclined hinge axis. In this device, when the towing motorcycle tilts as it does when in a turn, the forces transmitted to the trailer, which cause it to tilt with the motorcycle, are transmitted to and carried by the hinges of the joint connecting the trailer frame to the towing motorcycle. Depending on the weight being carried by the trailer, these forces could readily cause a distortion of the hinges, thus causing them to bind and thereby limiting their free pivoting movement about their axis, and in severe cases breaking the hinge.

Another prior art trailer includes a hitch incorporating two mutually perpendicular spindles, one spindle being disposed in the transverse horizontal plane of the trailer and the other being disposed in a vertical longitudinal plane of the trailer. Again, when the towing motorcycle is tilted from the vertical, as it will be in making a turn, the forces transmitted to the trailer to cause it to tilt with the motorcycle are carried entirely by the spindles. These forces can be great enough to deform the spindles, causing them to bend or even break.

A further prior art trailer includes a suspension system which is comprised generally of coiled springs disposed between a trailer bed and a frame upon which the trailer road wheel is mounted. These springs are illustrated as coil springs which are oriented to act as compression springs, i.e., they are loaded in the direction of their longitudinal axes.

Yet another prior art trailer teaches a road wheel suspension system having the road wheel mounted at one end of an arm, the arm being pivotally mounted between its ends to a frame of the trailer, and a coil spring disposed between the other end of the arm and the trailer frame. Again, the coil spring is deformable along its longitudinal axis by the forces being applied to it by the arm.

Further, none of these prior art trailer suspension systems are adjustable.

No prior art trailer known to me provides the combination and attributes of the present invention, viz. a trailer having a simple, inexpensive hitch member which transmits forces from the towing motorcycle to the trailer to cause the trailer to follow the maneuvers of the towing motorcycle without transmitting these forces to the hinge of the hitch and provides a trailer road wheel suspension system which is adjustable to provide various suspension system spring rates to accommodate various weights carried on the trailer. The trailer is also formed to utilize wind forces generated as the motorcycle is moving to urge the trailer downwardly and to thereby aid in keeping the trailer from bouncing and skipping about as it is being towed at high speeds or in high winds.

BRIEF SUMMARY OF THE INVENTION

The present invention provides a trailer hitch having two spaced apart flat plates connected to a trailer by a hinge having a transversely disposed horizontal axis. A single flat plate is slidably received between the two parallel flat plates and each of the flat plates has a hole disposed therethrough to receive a pin which forms a hinge having a vertical axis. Means are provided for removably attaching the trailer including the hinge assembly formed by the flat plates, to a motorcycle. When the motorcycle tilts, as it will when making a turn, the flat plates coact with each other to apply a force to the trailer to cause it to tilt in the same direction and to the same degree as the motorcycle but without applying a force to the pin forming the hinge. A two point tubular connection is provided between the hinge plates and the motorcycle. This combination provides sufficient rigidity and strength to provide good connection between the motorcycle and the trailer while the plates in combination with the vertical hinge provide a means permitting the trailer to bank with the motorcycle while still following the motorcycle as it is turning.

In addition, the trailer is equipped with an adjustable trailer road wheel suspension system which allows the spring rate of the suspension springs to be adjusted according to the weight being towed on the trailers. The suspension system includes a support having a hinge transversely disposed, having a horizontal axis and a pre-loadable adjustable torsion spring operatively associated with this rear wheel transversely disposed hinge axis. The body of the trailer is designed to translate the substantially horizontal wind forces to a vertical force against the top of the trailer to thereby urge the trailer downwardly against the road.

BRIEF DESCRIPTION OF THE DRAWINGS

One embodiment of the present invention is illustrated in the accompanying drawings, wherein like numerals refer to like parts throughout the several views, and in which:

FIG. 4 is a top exploded view of the hitch of the present invention;

FIG. 5 is a perspective view of a trailer frame incorporating the hitch and suspension system of the present invention;

FIG. 6 is a perspective view of the suspension system of the present invention;

FIG. 7 is an enlarged fragmented perspective view of a portion of the suspension system illustrated in FIG. 6;

FIG. 8 is a sectional view of the trailer hitch taken substantially along line 8—8 of FIG. 5; and FIG. 9 is a side view partially in section of the adjustable mounting means to attach a portion of the trailer hitch to a motorcycle.

DETAILED DESCRIPTION OF THE INVENTION

Figure 1:
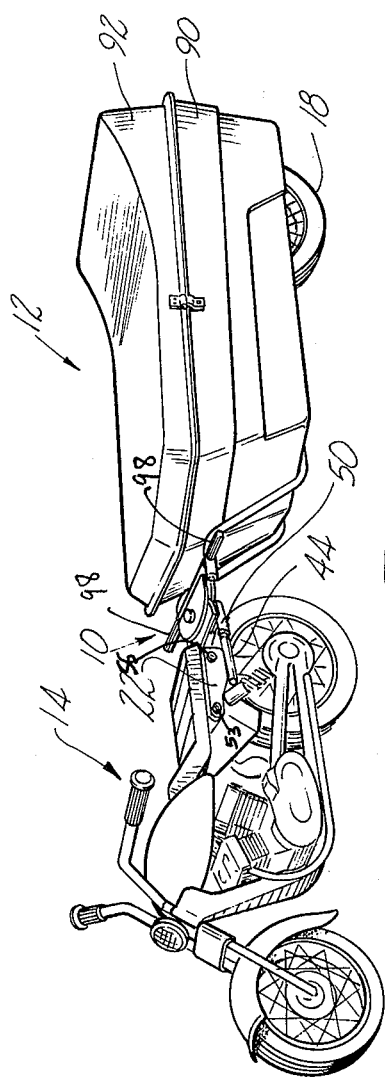
FIG. 1 is a perspective view of a motorcycle having a trailer of the present invention attached behind it.

With reference to FIG. 1, the present invention provides a trailer hitch, generally indicated at 10, for attaching a trailer, generally indicated at 12, to a motorcycle 14.

Figure 2:
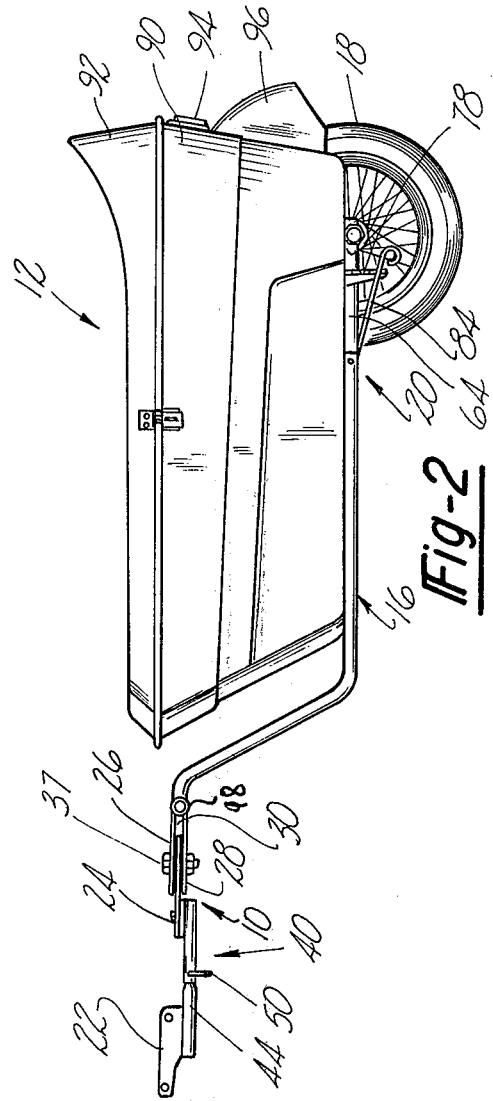
FIG. 2 is a side elevational view of the trailer of FIG. 1 incorporating the hitch and adjustable trailer road wheel suspension system of the present invention.

As can be seen in FIG. 2, the trailer 12 includes a frame 16 and a road wheel 18. The trailer also incorporates an adjustable trailer road wheel suspension system, generally denoted as 20. The structural attachment of the hitch 10 to the motorcycle 14 is schematically illustrated at 22.

Figure 3:
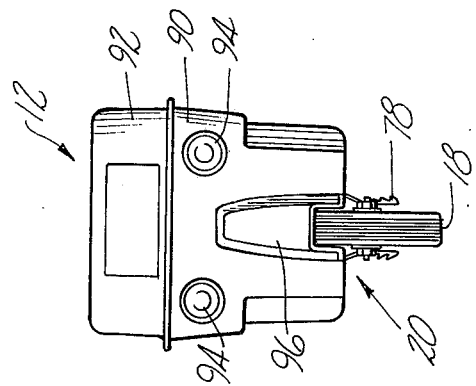
FIG. 3 is a rear elevational view of the trailer of FIG. 2.

FIG. 3 shows a rear view of the trailer 12 and the adjustable suspension system 20.

Now with reference to FIGS. 4 and 5, the trailer hitch 10 comprises a hinged section formed by two components. The first component is a first flat plate 24 and the second component is formed of two parallel spaced apart second and third flat plates 26, 28, respectively, which are attached to one end of the trailer frame 16. The second and third flat plates 26, 28 define a space 30 therebetween which slidably receives the first flat plate 24. The first flat plate 24 has a hole 32 therethrough generally perpendicular to its major flat surfaces, and each of the second and third flat plates 26, 28 also has a hole 34, 36, respectively, therethrough generally perpendicular to its major flat surfaces. In addition, the holes 34, 36 are coaxial with each other. A bolt 37 is received through the hole 32 and holes 34, 36 to connect the first flat plate 24 to the second and third flat plates 26, 28, thus forming a hinge having a vertically disposed axis about which the first and second components of the hitch 10 can pivot.

The hitch 10 further comprises symmetrical attachment means, generally denoted as 40 adjustably attached to the motorcycle on opposite sides thereof. With reference to FIGS. 4, 8 and 9, the attachment means 40 includes two spaced apart elongated first members, such as hollow tubes 42, which are fixed to bracket members 43 which in turn are each adjustably attached at one end to the first flat plate 24 by bolt 56, and two elongated second members, such as hollow tubes 44, which are each adjustably attached at one end to the motorcycle 14 on opposite sides thereof. The other end of each of the hollow tubes 42 is adjustably attached to a different one of the hollow tubes 44 near their other ends. The components of the attachment means 40 associated with the opposite sides of the motorcycle 14 and the first flat plate 24 are identical and are referred to by like numerals. While the following description refers to one hollow tube 42 and one hollow tube 44 on one side of the motorcycle 14 for clarity, it holds true with reference to both tubes 42 and both tubes 44 also.

As can best be seen in FIG. 9, the hollow tube 44 includes holes 48 defined therethrough along its longitudinal axis, and the hollow tube 42 includes holes 46 defined therethrough along its longitudinal axis. The hollow tube 42 axially slidably receives therein the hollow tube 44. The holes 46 in hollow tube 42 and the holes 48 in hollow tube 44 removably receive a hitch pin 50 to connect the tubes 42 and 44 together. The tube 44 could, of course, be a rod or it could receive the tube 42.

As can best be seen in FIG. 1, the hollow tube 42 is mounted to the motorcycle by a bracket 51 (FIG. 9) which is mounted to the frame of the motorcycle under or near the seat by a bolt 53 and by a shock absorber bolt 55. The trailer 12 is mounted to the motorcycle 10 by attaching the tubes 42 and 44 together.

As can best be seen in FIG. 4, a slotted hole 52 is defined in the first flat plate 24 generally transversely to the longitudinal axis of the trailer and a hole 54 is defined in the bracket 43 attached to the hollow tube 42. The bolt 56 is received through the slotted hole 52 in the first flat plate 24 and the hole 54 in the bracket 43 to adjustably connect them together. This permits accommodation of motorcycles of different widths.

FIGS. 5 and 8 illustrate the attachment means of the second and third plates 26, 28 to one end of the trailer frame 16 (FIG. 5). This attachment means includes a hinge 58 pivotally affixed to the trailer frame 16, with its pivotal axis horizontally disposed and transverse to the longitudinal axis of the trailer. The hinge 58 is affixed to the second and third flat plates 26, 28. The hinge 58 includes a transversely disposed tube 60 affixed to the trailer frame 16, and a hollow tube 62 which axially and rotatably receives the tube 60. The second flat plate 26 and third flat plate 28 are attached as by welding to the hollow tube 62. The hinge 58 allows the second and third flat plates 26, 28 to arcuately pivot about the axis of the hinge in the vertical longitudinal plane of the trailer frame as indicated on the line A—A of FIG. 8.

As can be best seen in FIGS. 5, 6 and 7, the adjustable trailer road wheel suspension system 20 for resiliently mounting the trailer road wheel 18 to the trailer is located at the other end of the frame 16 from the hitch 10. The road wheel 18 is rotatably mounted to one end of a support 64. The support 64 is operatively affixed at its other end to a swing arm 68 pivotally affixed to the trailer frame 16, with its axis of rotation horizontally disposed transversely thereto so that the road wheel 18 can pivot in the vertical longitudinal plane of the trailer frame. The swing arm 68 includes a transversely disposed rod 70 affixed to the trailer frame 16, as by bolts (not shown) and a hollow tube 72 which axially and pivotally receives the rod 70. The support 64 is attached to the hollow tube 70 as by, for example, welding. The resilient components of the trailer road wheel suspension system 20 include two torsion springs 74, each axially disposed over opposite ends of the swing arm 68. First and second restraining means are associated with each of the torsion springs 74. Because each torsion spring 74 and the first and second restraining means associated with each torsion spring are identical and are referred to by like numerals, the following description refers to one torsion spring 74 and its associated first and second restraining means for clarity and also holds true with reference to both torsion springs 74 and both first and both second restraining means also.

The first restraining means is a transversely disposed bar 76 affixed at its ends to the trailer frame 12 in front of the hinge rod 70 as by, for example, welding. The second restraining means is a bracket 78 (FIGS. 5–6) structurally affixed to the road wheel support 64 as by welding. The bracket 78 includes a plurality of notches 80 defined therein, each having one open end 81. As mentioned above, each torsion spring 74 is disposed axially over one end of the swing arm 68, with its longitudinal axis substantially coaxial with the longitudinal axis of the rod 70. One end of the torsion spring 74 forms a hook 82 which clampingly engages the bar 76 and in so doing is restrained. The other end of the coil spring 74 forms a tang 84 which is selectively received in a selected one of the notches 80 through its open end 81 in the bracket 78 and is restrained thereby. The coil spring 74 is torsionally preloaded to different selected loads by placing the tang 84 in different selected notches 80 because the other end of the coil spring 74 is restrained. The coil spring 74 is biased in a direction which resists an upward movement of the road wheel in relationship to the trailer.

The first plate 24 is adjusted with relationship to the motorcycle 14 by sliding the hollow tubes 42 axially with respect to the hollow tubes 44 as best seen in FIG. 9. When the appropriate holes 46 in the tube 42 line up with one of the appropriate holes 48 in the tube 44 to produce the desired space between the first flat plate 24 and the motorcycle 14, the pins 50 are inserted through the holes 46, 48 in the hollow tubes 42, 44 to connect them together. The elongated slots 52 in the plate 24 permit the plate 24 to accommodate motorcycles of different widths.

To hitch the trailer 12 to the motorcycle 14, the tube members 44 are mounted to opposite sides of the motorcycle 10 and after the brackets 43 of the tube members 42 have been properly spaced on the flat plate 24 by means of the slots 52 the tube members 42 are inserted over the tube members 44 and the hinge pins 50 are inserted to lock the tube members 42, 44 together. The flat plates 24, 26, and 28 form a connection which permits pivotal movement in only the vertical axis. As the towing motorcycle 14 tilts or leans as it turns, especially during shallow high speed turns, the hitch 10 of the present invention causes the trailer 12 to tilt or lean with the motorcycle by the interaction of the flat plates comprising the hitch 10 while allowing the trailer to pivot about the hitch. As the motorcycle 14 leans, the first flat plate 24 bears against the second and third flat plates 26, 28 transmitting a force thereto which causes the trailer 12 to lean with the motorcycle 14. The hitch 10 leaves the bolt 37, comprising the vertical hinge axis, free of those forces generated in the hitch which cause the trailer to lean with the motorcycle. If these forces were transmitted to the bolt 37, they could distort it, causing a binding between the bolt 37 and hitch 10 and preventing the trailer from pivoting about the hitch.

In addition, the hinge 58 with its transversely disposed horizontal axis allows the trailer and the motorcycle 14 to move relative to each other in the longitudinal vertical plane of the trailer as the motorcycle and trailer travel over undulating terrain.

The trailer road wheel suspension system can be adjusted to produce different predetermined spring rates of the torsion springs 74 to suit different weights carried on the trailer 12 by selectively placing the tang 84 in a different one of the notches 80. Moving the tang 84 from the lowermost notch to the higher notches in the bracket 78 requires an increasingly greater torsional load to be applied to the torsion spring. Because the end of the torsion spring having the hook 82 and the end of the torsion spring having the tang 84 are restrained, the torsion spring 72 stores this torsional energy. The torsion spring 74 is thus biased to resist upward movement of the trailer load wheel 18 in the vertical longitudinal plane of the trailer. The greater the weight to be carried by the trailer, the greater the torsion springs 74 can be preloaded by merely moving the tang 84 to one of the notches 80 corresponding to a greater torsional loading of the torsion springs.

As can best be seen in FIGS. 1-3, a box 90 is mounted to the frame 16 and is provided with a smoothly contoured, generally flat upswept rear portion 92 which acts to utilize the wind forces produced as the trailer is being towed to produce a downward force on the trailer. This downward force adds considerably to the stability of the trailer and aids in holding it to the road even when unloaded and in relatively high winds. Tail lights 94 are provided on the back of the box 90 and are adapted to be connected into the lighting system of the motorcycle in the conventional manner. A fender 96 preferably extends outwardly from the rear of the box 90 to house a portion of the wheel 18.

Handles 98 are provided on each side of the frame 16 as can best be seen in FIGS. 1, 2 and 5 to aid in moving the trailer about when it is not attached to the motorcycle.

The foregoing detailed description is given primarily for clarity of understanding and no unnecessary limitations should be understood therefrom for modifications will be obvious to those skilled in the art upon reading this disclosure and may be made without departing from the spirit of the invention or the scope of the appended claims.

We claim:

1. A trailer adapted to be towed behind a motorcycle or the like, said trailer having a frame, a rotatably mounted road wheel, a hitch for removably attaching said trailer to said motorcycle, said hitch comprising:

a first plate having at least one hole disposed therein;
parallel, spaced apart second and third plates to slidably receive said first plate therebetween, each of said second and third plates having at least one hole disposed therein, said hole in said second plate being in line with said hole in said third plate, said first plate, said second plate and said third plate being disposed in a generally horizontal plane,
a pin extending through said hole in said second plate, said hole in said third plate and said hole in said first plate to form a hinge having a generally vertical axis about which said motorcycle and said trailer can pivot with respect to each other, so that when said motorcycle is tilted from the vertical said trailer will be tilted in the same direction and generally at the same angle by the coaction of said first, second and third plates so that said pin is free of forces applied to said hitch by the tilting of said motorcycle;
means to attach said hitch to said motorcycle;
means to attach said hitch to said trailer frame, said means comprising two elongated first members, means to attach each of said elongated first members at one of its ends to said first plate; two elongated second members, means to attach each of said second members at one of its ends to said motorcycle; means to attach the other end of each of said elongated first members to the other end of a different one of said elongated second members, said elongated first members being hollow tubes, said means to attach each of said elongated first members to said first plate comprising means defining at least one transversely disposed slot in said first plate, means attaching said elongated tubes to said first plate through said transversely disposed slots, said elongated second members being hollow tubes, each of said elongated second members being axially and slidably receivable in a different one of said elongated first members; and said means to attach each of said elongated first members to a different one of said elongated second members comprising a plurality of alignable holes in said first and second members and means insertable through said holes to lock said members together.

2. The trailer as defined in claim 1, wherein said means to attach said hitch to said trailer frame comprises a first hinge having a horizontal axis disposed transversely to said trailer frame, said hinge being affixed to said hitch and to said trailer frame so that said trailer frame can move in a generally vertical plane relative to said motorcycle about the axis of said first hinge.

3. The trailer as defined in claim 2, wherein said first hinge is affixed to said second plate, said third plate and to said trailer frame.

4. The trailer as defined in claim 2, wherein said first hinge comprises a transversely disposed first rod structurally attached to said trailer frame; a transversely disposed hollow tube structurally attached to said second and third plates; and said first rod axially received in said hollow tube so that said hollow tube can rotate about said rod.

5. The trailer as defined in claim 1 and including a box carried by said frame, said box having a smoothly contoured upstanding rear portion.

6. A trailer adapted to be towed behind a motorcycle or the like, said trailer having a frame, a rotatably mounted road wheel, a hitch for removably attaching said trailer to said motorcycle, said hitch comprising:
   a first plate, and parallel, spaced apart second and third plates to slidably receive said first plate therebetween,
   means extending through said plates to form a hinge having a generally vertical axis about which said motorcycle and said trailer can pivot with respect to each other, so that when said motorcycle is tilted from the vertical said trailer will be tilted in the same direction and generally at the same angle by a coaction of said first, second and third plates so that said hinge means is free of forces applied to said hitch by the tilting of said motorcycle;
   means to attach said hitch to said motorcycle;
   means to attach said hitch to said trailer frame; said means comprising two elongated first members, means to attach each of said elongated first members at one of its ends to said first plate; two elongated second members, means to attach each of said second members at one of its ends to said motorcycle; means to attach the other end of each of said elongated first members to the other end of a different one of said elongated second members, said elongated first members being hollow tubes, said means to attach each of said elongated first members to said first plate, comprising each of said elongated second members being axially and slidably receivable in a different one of said elongated first members; and said means to attach each of said elongated first members to a different one of said elongated second members comprising means for locking said members together at different axial positions.

7. The trailer as defined in claim 6 and in which said locking means include means for selectively positioning said elongated second members with respect to said elongated first members whereby the spacing between said motorcycle and said trailer can be varied.

8. The trailer as defined in claim 6 and including means for adjustably varying the space between said elongated first members whereby to accomodate variances in the spacing between said elongated second members to accomodate motorcycles of different widths.

9. The trailer as defined in claim 6 and including a box carried by said frame, said box having a smoothly contoured upstanding rear portion.

* * * * *